United States Patent [19]

Halliday et al.

[11] Patent Number: 4,544,452
[45] Date of Patent: Oct. 1, 1985

[54] CONTROL OF A FRACTIONAL DISTILLATION PROCESS

[75] Inventors: Mary M. Halliday, Old Ocean; Glen R. Jackson, Bay City, both of Tex.

[73] Assignee: Phillips Petroleum Company, Bartlesville, Okla.

[21] Appl. No.: 528,023

[22] Filed: Aug. 31, 1983

[51] Int. Cl.$^4$ ............................................. B01D 3/42
[52] U.S. Cl. ......................................... 203/1; 203/2; 203/3; 62/21; 62/37; 202/160; 202/206; 364/501
[58] Field of Search ...................... 203/1–3, 203/DIG. 18; 202/160, 206; 196/132, 141; 208/DIG. 1; 62/21, 37; 364/501; 585/809

[56] References Cited

U.S. PATENT DOCUMENTS

| | | | |
|---|---|---|---|
| 3,018,230 | 1/1962 | Morgan | 203/3 |
| 3,156,628 | 11/1964 | Larrison | 203/3 X |
| 3,259,554 | 7/1966 | Constantikes | 203/3 X |
| 3,361,646 | 1/1968 | MacMullan et al. | 203/3 X |
| 3,477,916 | 11/1969 | McNeill et al. | 203/3 |
| 4,316,255 | 2/1982 | Jensen | 364/501 |
| 4,371,426 | 2/1983 | DiBiano et al. | 203/3 X |
| 4,400,239 | 8/1983 | Hobbs | 202/160 |
| 4,473,443 | 9/1984 | Hobbs | 203/3 |

Primary Examiner—Wilbur Bascomb
Attorney, Agent, or Firm—French and Doescher

[57] ABSTRACT

In a fractional distillation process in which it is desired to maintain a desired overhead product composition and bottoms product composition, a set point for the flow rate of the external reflux to the fractional distillation column is increased or decreased by an incremental amount or is left constant based on whether the concentration by the heavy key component in the overhead product stream and the concentration of the light key component in the bottoms product stream are above a high limit, below a low limit, between the high limit and low limit or some combination thereof and also based on the relationship between a set point for the flow rate of the external reflux and a high limit for the flow rate of the external reflux. At the same time, a temperature set point for the fractional distillation column is increased or decreased by an incremental amount or is left constant depending on the same factors. Use of these set points for process control provides control of the overhead product composition and bottoms product composition without the use of analysis controllers.

12 Claims, 2 Drawing Figures

CONTROL OF A FRACTIONAL DISTILLATION PROCESS

This invention relates to method and apparatus for controlling a fractional distillation column so as to maintain a desired overhead product composition and a desired bottoms product composition or to at least maintain a desired overhead product composition if both the overhead product composition and bottoms product composition cannot be maintained.

Fractional distillation columns are employed in many chemical manufacturing processes to make desired separations. Typically, a feed stream containing at least first (light key) and second (heavy key) components is supplied to the fractional distillation column. It is generally physically impossible to completely separate the light key component from the heavy key component and thus, while an overhead product stream removed from the fractional distillation column may contain a substantial portion of the light key component contained in the feed stream, the overhead product stream will also contain some concentration of the heavy key component. In like manner, a substantial portion of the heavy key component contained in the feed stream may be removed from the fractional distillation column in a bottoms product stream but the bottoms product stream will also contain some concentration of the light key component. Generally, a desired concentration of the heavy key component in the overhead product stream and of the light key component in the bottoms product stream will be known for any particular fractional distillation process. These desired concentrations are generally set so as to substantially maximize the profitability of the fractional distillation process while also maintaining desired product specifications.

The concentration of the heavy key component in the overhead product stream can be controlled by manipulating a process variable such as the heat supplied to the fractional distillation column in response to the output from an analysis controller which is provided the actual concentration of the heavy key component in the overhead product as a process variable and which is provided a desired concentration as a setpoint. In like manner, the concentration of the light key component in the bottoms product stream can be controlled by manipulating a process variable such as the flow rate of the external reflux to the fractional distillation column in response to the output from an analysis controller which is provided the actual concentration of the light key component in a bottoms product stream as a process variable input and which is provided the desired concentration as a setpoint input.

As used herein, the term "analysis controller" refers to a controller which compares an actual concentration to a desired concentration and provides an output signal which is responsive to the difference between the actual concentration and desired concentration. Analysis controllers will typically have proportional and integral action and will often also have derivative action.

While control based on the outputs of analysis controllers is generally effective for many fractional distillation columns, in some processes, such as the manufacture of ethylene, a product from a fractional distillation column is recycled to an upstream unit. As an example, in an ethylene manufacturing process the bottoms product (principally ethane) from the $C_2$ splitter is typically utilized to exchange heat in the deethanizer column overhead condensing system and is then combined with the feed flowing to the cracking furnace. The feed from the cracking furnace is provided to the deethanizer column and the overhead product from the deethanizer column is provided to the $C_2$ splitter. Any change in the rate at which heat is supplied to the $C_2$ splitter or in the external reflux flow to the $C_2$ splitter causes a change in the recycle ethane flow which causes heat upset to the deethanizer. The heat upset returns to the $C_2$ splitter as an upset in feed flow. This feedback affect can result in severe cycling of the entire separations train when typical control based on the output of analysis controllers which employ proportional, integral and perhaps derivative actions are utilized to control the overhead product composition and bottoms product composition since analysis controllers may try to force a process variable to change quickly in an effort to force an actual concentration to equal a desired concentration during a period of process upset.

It is thus an object of this invention to provide method and apparatus for controlling a fractional distillation column so as to maintain a desired overhead product composition and a desired bottoms product composition without causing the cycling which can occur in interactive fractional distillation columns when the control of overhead product composition and bottoms product composition is based on the output of analysis controllers which are comparing actual and desired concentrations.

Control of two process variables is utilized in accordance with the present invention to accomplish the above objective. However, under some conditions such as high feed rates, one of the process variables may reach a high limit. When this occurs, both the overhead product composition and bottoms product composition may be driven off specification. It is thus a further object of this invention to not only prevent cycling but also prevent the overhead product composition from being driven off specification when a process variable being utilized to control the overhead product composition and bottoms product composition reaches a high limit.

In accordance with the present invention, method and apparatus is provided whereby the set point for the flow rate of the external reflux to the fractional distillation column is increased or decreased by an incremental amount or left constant based on whether the concentration of the heavy key component in the overhead product stream and the concentration of the light key component in the bottoms product stream are above a high limit, below a low limit, between the high limit and low limit or some combination thereof. At the same time, a temperature set point for the fractional distillation column, which determines the rate at which heat is supplied to the fractional distillation column, is increased or decreased by an incremental amount or is left constant depending on the same factors. Control of the overhead product composition and bottoms product composition is accomplished based on these set points without the use of analysis controllers. Cycling is avoided because only the incremental changes in the external reflux flow rate set point and the set point for a temperature in the fractional distillation column can be made regardless of how far off specification the overhead product composition or bottoms product composition are. Essentially, small incremental changes are made in the right direction but no large changes are made quickly so as to cause sudden changes in the flow rate of the bottoms product stream which could result in the described cycling in processes in which a product stream from a fractional distillation column is recycled to an upstream unit.

If the external reflux flow rate reaches a high limit, the setpoint of the flow of the external reflux will remain at such high limit and only the temperature setpoint for the fractional distillation column will be changed which will result in only the overhead product composition remaining on specification. Essentially, this is accomplished by removing the effect of the concentration of the light key component in the bottoms product stream being off specification from the control action. This produces the desired result of at least maintaining the overhead product composition on specification.

Other objects and advantages of the invention will be apparent from the foregoing brief description of the invention and the appended claims as well as from the detailed description of the drawings in which:

The invention is illustrated and described in terms of a specific fractional distillation process for the separation of ethylene from ethane. However, the invention is applicable to any fractional distillation process in which it is desired to maintain a desired overhead product composition and bottoms product composition and is particularly applicable to those processes where a product stream is recycled to an upstream unit.

Also, the foregoing description of the invention and the background of the invention as well as the detailed description which follows are in terms of a light key component and a heavy key component because control is almost always based on these components. However, the invention is applicable to controlling the concentration of any component in either the bottoms product and the overhead product.

The invention is described in terms of controlling the heat flow to the fractional distillation column so as to maintain a desired temperature at a selected tray. Other temperatures could be utilized to control the heat flow if desired but any temperature associated with a fractional distillation column can generally be associated with the temperature at some tray in the column.

Figure 1:
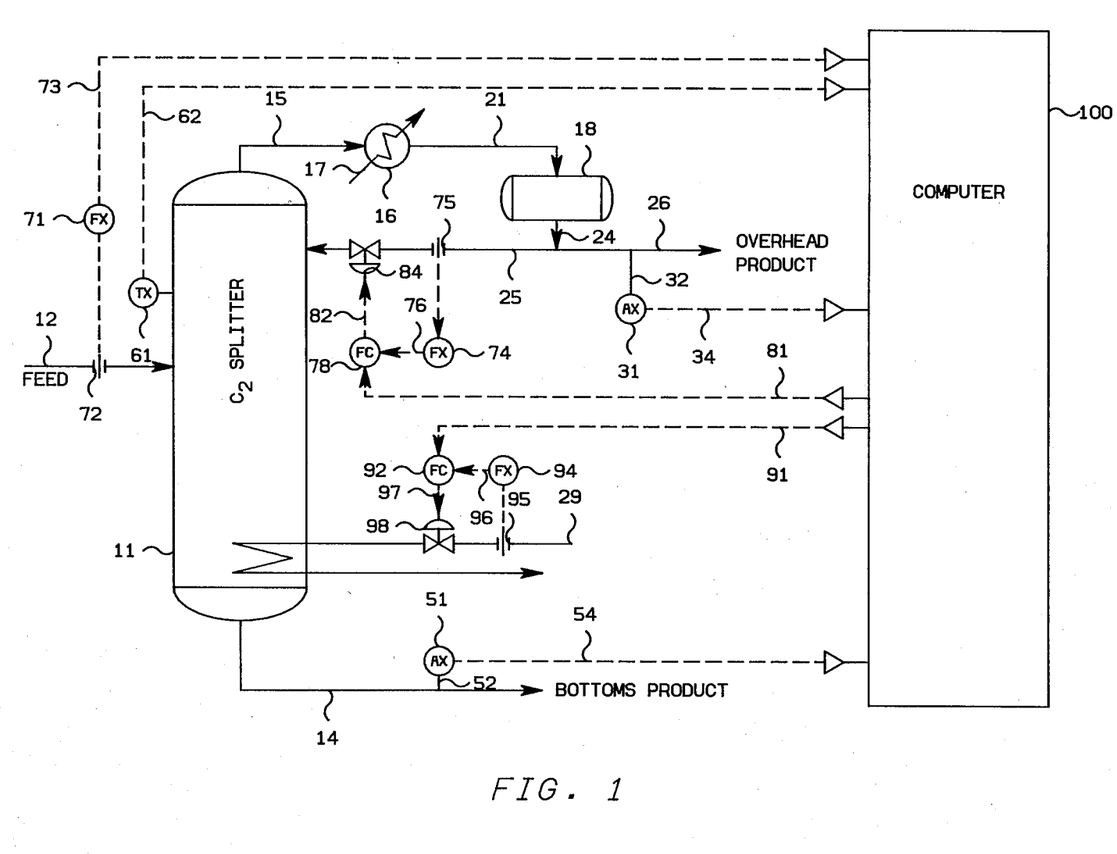
FIG. 1 is a diagrammatic illustration of a fractional distillation process with the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The flow and temperature controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurment signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular FIG. 1, there is illustrated a fractional distillation column 11. A feed stream consisting essentially of ethylene and ethane is provided to the fractional distillation column 11 through conduit means 12. Ethane (heavy key) is removed as a bottoms product through conduit means 14 and is typically recycled to the cracking furnace as has been previously described. Ethylene (light key) is removed in an overhead vapor stream from the frictional distillation column 11 through conduit means 15. It is again noted that, while the bottoms product stream will consist principally of ethane, it will also contain some concentration of ethylene. In like manner, the overhead product will contain some concentration of ethane.

The overhead stream flowing through conduit means 15 is provided from the fractional distillation column 11 through conduit means 15 to the heat exchanger 16. The heat exchanger 16 is provided with a cooling medium through conduit means 17. The at least partially condensed fluid stream from the heat exchanger 16 is provided to the overhead accumulator 18 through conduit means 21. A first portion of the liquid in the overhead accumulator 18 is provided through the combination of conduit means 24 and 25 as an external reflux to the fractional distillation column 11. A second portion of the liquid in the accumulator 18 is removed through the combination of conduit means 24 and 26 as the overhead product.

A heating fluid (typically steam) is provided to the fractional distillation column 11 through conduit means 29. This is a typical manner of supplying heat to a fractional distillation column but other methods could be utilized if desired.

The fractional distillation process for separating ethylene from ethane described to this point is conventional. It is the manner in which the fractional distillation process is controlled which provides the novel features of the present invention.

Analyzer transducer 31, which is preferably a Model 102 Process Chromatograph manufactured by Applied Automation, Inc., Bartlesville, Okla., is in fluid communication with conduit means 26 through conduit means 32. The analyzer transducer 31 provides an output signal 34 which is representative of the concentration of ethane in the ethylene product flowing through conduit means 26. Signal 34 is provided from the analyzer transducer 31 as an input to computer 100.

Analyzer transducer 51, which is also preferably a Model 102 Process Chromatograph, is in fluid communication with conduit means 14 through conduit means 52. The analyzer transducer 51 provides an output signal 54 which is representative of the concentration of ethylene in the ethane product flowing through conduit means 14. Again, by specifying the concentration of ethylene in the bottoms product stream, the purity of the bottoms product stream is specified. Signal 54 is provided from the analyzer transducer 51 as an input to computer 100.

Temperature transducer 61 in combination with a temperature measuring device such as a thermocouple, which is operably located in the fractional distillation column 11 at a selected tray, provides an output signal 62 which is representative of the actual temperature at such selected tray. Signal 62 is provided from temperature transducer 61 as an input to computer 100.

Flow transducer 71 in combination with the flow sensor 72, which is operably located in conduit means 12, provides an output signal 73 which is representative of the flow rate of the feed stream flowing through conduit means 12. Signal 73 is provided from the flow transducer 71 as an input to computer 100.

in response to the described input signals, computer 100 calculates a set point for the external reflux flow rate and a set point for the heating fluid flow rate. Signal 81, which is representative of the calculated set point for the external reflux flow rate, is provided as the set point signal to the flow controller 78. Flow transducer 74 in combination with flow sensor 75, which is operably located in conduit means 25, provides an output signal 76 which is representative of the actual flow rate of the external reflux flowing through conduit means 25. Signal 76 is provided as the process variable input to the flow controller 78. In response to signals 76 and 81, the flow controller 78 provides an output signal 82 which is responsive to the difference between signals 76 and 81. Signal 82 is scaled so as to be representative of the position of the control valve 84, which is operably located in conduit means 25, required to maintain the actual flow rate of the external reflux substantially equal to the desired flow rate as represented by signal 81. Signal 82 is provided as a control signal to the control valve 84.

Signal 91, which is representative of the calculated set point for the heating fluid flow rate, is provided as the set point signal to the flow controller 92. Flow transducer 94 in combination with the flow sensor 95, which is operably located in conduit means 29, provides an output signal 96 which is representative of the actual flow rate of the heating fluid flowing through conduit means 29. Signal 96 is provided from the flow transducer 94 as the process variable input to the flow controller 92. In response to signals 91 and 96, the flow controller 92 provides an output signal 97 which is responsive to the difference between signals 91 and 96. Signal 97 is scaled so as to be representative of the position of the control valve 98, which is operably located in conduit means 29, required to maintain the actual flow rate of heating fluid substantially equal to the desired flow rate as represented by signal 91. Signal 97 is provided as a control signal to the control valve 98.

Figure 2:
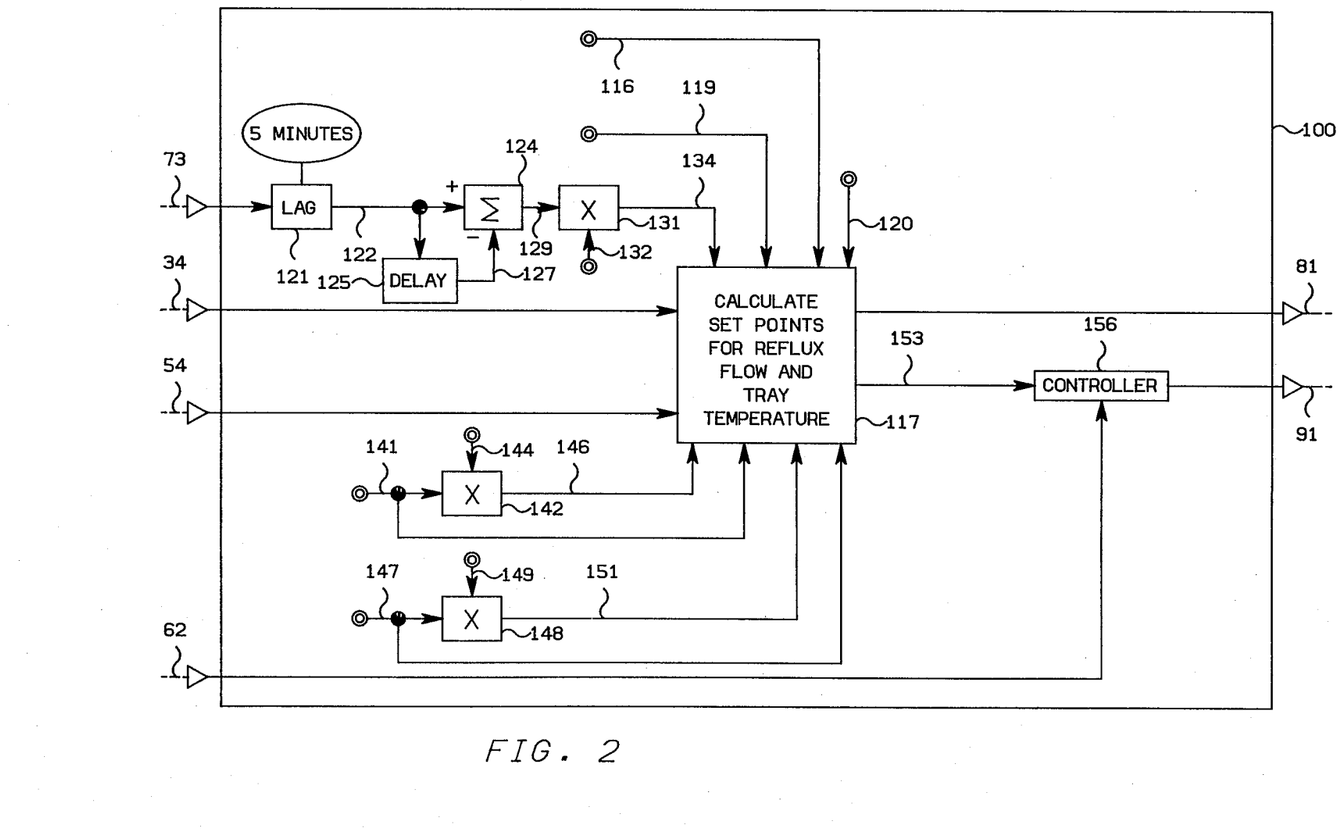
FIG. 2 is a representation of computer logic suitable for calculation of the control signals illustrated in FIG. 1 based on the process measurements illustrated in FIG. 1.

Referring now to FIG. 2, signal 116 is representative of the increment by which the set point for the tray temperature can be changed each time a new set point is calculated (referred to as a "pass"). A typical increment is about 0.004° F./Pass. Signal 119 is representative of the increment by which the external reflux flow rate can be changed each time a new set point is calculated. A typical increment is about 0.4 Barrels/Hr/Pass. Signal 120 is representative of the high limit for the flow rate of the external reflux flowing through conduit means 25. Signals 116, 119 and 120 are supplied to block 117.

Signal 73, which is representative of the flow rate of the feed stream flowing through conduit means 12, is provided as an input to the lag block 121. The lag block 121 is an exponential lag the function of which is well known to those skilled in process control. Essentially, the lag 121 prevents a step change in the feed flow rate from being reflected directly through the process control system. A step change in the magnitude of signal 73 will cause an exponential change in the magnitude of signal 122. The time required for the magnitude of signal 122 to change to the new magnitude of signal 73 after a step change is known as the time constant of the lag 121. Essentially, the time constant is chosen to compensate for the difference between the time required for a change in the feed flow rate to affect the output of the analyzer 51 and the time required for a change in the reflux flow rate to affect the output of the analyzer 51. The preferred time constant for lag 121 is 5 minutes. Signal 122 is provided from the lag 121 as an input to the summary block 124 and as an input to the delay block 125.

The delay block 125 is utilized to calculate the difference in feed flow rate between successive executions of the control program (passes). Essentially, the output signal 127 from the delay block 125 is subtracted from signal 122 to establish signal 129. If the flow rate of the feed has not changed from the previous pass, the magnitude of signal 129 will be zero. Only when the flow rate of the feed changes will the magnitude of signal 122 be different from the magnitude of 127 such that signal 129 will have a magnitude. A delay on the order of 30 sec. is typical.

Signal 129 is provided from the summing block 124 as an input to the multiplying block 131. The multiplying block 131 is also provided with biasing signal 132. The magnitude of the biasing signal 132 is chosen based on the effect the process control engineer wishes to allow a change in the feed flow rate to have on the process control system. A typical magnitude for signal 132 is 0.60. Signal 129 is multiplied by signal 132 to establish signal 134. Signal 134 is provided from the multiplying block 131 as an input to block 117. Essentially, signal 134 is a feedforward control signal based on the feed flow rate as will be discussed more fully hereinafter.

Signal 34, which is representative of the ethane concentration in the overhead product stream flowing through conduit means 26, is provided as an input to block 117. Signal 54, which is representative of the ethylene concentration in the bottoms product stream flowing through conduit means 52, is also provided as an input to block 117.

Signal 141, which is representative of the desired concentration of ethane in the overhead product stream flowing through conduit means 26, is provided as an input to the multiplying block 142 and is also provided as an input to block 117. The desired concentration of ethane is utilized as a high limit in the present invention.

Signal 144, which is representative of some percentage such as 80%, is provided as a second input to the multiplying block 142. Signal 141 is multiplied by signal 144 to establish signal 146 which is representative of a low limit for the ethane concentration in the overhead product stream flowing through conduit means 26. Signal 146 is provided from the multiplying block 142 as an input to block 117.

Signal 147, which is representative of a set point for the concentration of ethylene in the bottoms product stream flowing through conduit means 14, is provided as an input to the multiplying block 148 and to block 117. The desired concentration of ethylene in the bottoms product flowing through conduit means 14 is utilized as a high limit in the present invention.

Signal 149, which is representative of some percentage such as 80%, is provided as a second input to the multiplying block 148. Signal 149 is multiplied by signal 147 to establish signal 151 which is representative of a low limit for the ethylene concentration in the bottoms product flowing through conduit means 14. Signal 151 is provided from the multiplying block 148 as an input to block 117.

In response to the described inputs, the set point signal 81 for the flow rate of external reflux and the set point signal 153 for the tray temperature are calculated in block 117. The manner in which signals 81 and 153 are calculated is set forth in the listing which follows. Symbols used in the listing are defined as follows:

| | |
|---|---|
| A9308 = | the measured concentration of ethane in the overhead product stream flowing through conduit means 26 (signal 34) |
| A9308H = | the desired concentration of ethane in the overhead product stream flowing through conduit means 26 (signal 141) |
| A9307 = | the measured concentration of ethylene in the bottoms product stream flowing through conduit means 14 (signal 54) |
| A9307H = | the desired concentration of ethylene in the bottoms product stream flowing through conduit means 14 (signal 147) |
| A9308L = | a low limit on the concentration of ethane in the overhead product stream flowing through conduit means 26 (signal 146) |
| A9307L = | a low limit on the centration of ethylene in the bottoms product stream flowing through conduit means 14 (signal 151) |
| DELR = | the increment by which the external reflux flow rate can be changed each time a new set point is calculated (signal 119) |
| DELT = | the increment by which the tray temperature can be cha'ged each time a new set point is calculated (signal 116) |
| T9400S = | the calculated set point for the tray temperature (signal 153) |
| F0482S = | the calculated set point for the external reflux flow rate (signal 81) |
| DRFF = | the feed forward control signal based on the feed flow rate (signal 134) |
| F0482H = | the high limit for the external reflux flow rate (signal 120) |

Other symbols set forth in the listing are either calculated in the listing or are standard FORTRAN symbols.

| LISTING |
|---|
| 1. IF(A9308.GT.A9308H) I9308 = 2 |
| 2. IF(A9307.GT.A9307H) I9307 = 2 |
| 3. IF(A9308.LT.A9308L) I9308 = 0 |
| 4. IF(A9307.LT.A9307L) I9307 = 0 |
| 5. IF((A9308 LE.A9308H).AND.(A9308.GE.A9308L)) |

```
                    LISTING
   I9308 = 1
6. IF((A9307 LE.A9307H).AND.(A9307.GE.A9307L))
   I9307 = 1
7. ISUM = I9308 + I9307
8. IDIFF = I9308 − I9307
9. IF(F0482S.GE F0482H) IDIFF = I9308-1
10. IF(ISUM.GT.2) DR = +DELR
11. IF(ISUM.EQ.2) DR = 0
12. IF(ISUM.LT.2) DR = −DELR
13. IF(IDIFF.GT.0) DT = −DELT
14. IF(IDIFF.EQ.0) DT = 0
15. IF(IDIFF.LT.0) DT = +DELT
16. T9400S = T9400S + DT
17. F0482S = F0482S + DR + DRFF
18. IF(F0482S.GE.F0482H) F0482S = F0482H
```

Referring now the listing, statements 1–6 are utilized to determine where the actual concentrations are with respect to the high and low limits. A sum and difference is then taken in statements 7 and 8.

Statement 9 is utilized to determine if it is possible to increase external reflux, and if it is not possible, a new value for IDIFF is calculated to replace the value calculated in statement 8. This is necessary because for heavy column loading the external reflux required to maintain desired concentrations for both the heavy key component in the overhead product stream and the light key component in the bottoms product stream can exceed a high limit for the external reflux flow. If a value for IDIFF is calculated in statement 9, a control action results in which a new set point for tray temperature will maintain the desired concentration for the heavy key component in the overhead product stream independently of the external reflux flow. Thus, under conditions of heavy column loading, the specification for the overhead product is maintained and the concentration of the light key component in the bottoms product is allowed to deviate from its set point.

Essentially, statement 9 is being utilized to convert the double ended control based on sum and difference to a single ended control which is based only on the overhead product composition. Again, this is accomplished by calculating a new value for IDIFF if the calculated set point for the external reflux from the previous pass is greater than or equal to the high limit for the external reflux flow rate.

The sum calculated in statement 7 is utilized to determined what control action will be taken with respect to the external reflux in statements 10–12 while the difference calculated in either statement 8 or 9 is utilized to determined what control action will be taken with respect to the tray temperature in statements 13–15. A new set point for the tray temperature is then calculated by adding the control action (DT) to the set point for the tray temperature from the last calculation. In like manner, a new set point for the flow rate of the external reflux is calculated by adding the control action (DR) to the set point for the flow rate of the external reflux previously calculated. Also, the feedforward control term is added to provide a means by which a change in the feed flow rate can be at least partially compensated for by changing the flow rate of the external reflux before a change in the feed flow rate would actually require such change by changing the composition of the overhead product stream and bottoms product stream.

Statement 18 is utilized to prevent the computer from providing a set point for the flow rate of the external reflux which is greater than the high limit. This is accomplished by overriding statement 17 if the calculated set point from statement 17 is greater than or equal to the high limit for the flow rate of the external reflux. Under these circumstances, the set point for the flow rate of the external reflux is set equal to the high limit. Again, this may cause the bottoms products to deviate from specification but the control will maintain the desired overhead product composition.

A summary of the control actions generated by the above described listing if F0482S is not greater than or equal to F0482H is set for in Table 1.

TABLE 1

| Concentrations | | Control Action | |
| --- | --- | --- | --- |
| Ethane | Ethylene | Tray Temp. | Ext. Reflux |
| LO (0) | LO (0) | no change | decrease |
| ME0 (1) | LO (0) | decrease | decrease |
| HI (2) | LO (0) | decrease | no change |
| LO (0) | MED (1) | increase | decrease |
| MED (1) | MED (1) | no change | no change |
| HI (2) | MED (1) | decrease | increase |
| LO (0) | HI (2) | increase | no change |
| MED (1) | HI (2) | increase | increase |
| HI (2) | HI (2) | no change | increase |

Essentially, the external reflux and/or the tray temperature will be changed each pass through the computer unless both the ethane concentration and ethylene concentration are between the high and low limits.

A summary of the control actions generated by the above described listing if F0482S is greater than or equal to F0482H is set for in Table 2.

TABLE 2

| Concentrations | | Control Action | |
| --- | --- | --- | --- |
| Ethane | Ethylene | Tray Temp. | Ext. Reflux |
| LO (0) | LO (0) | increase | no change |
| MED (1) | LO (0) | no change | no change |
| HI (2) | LO (0) | decrease | no change |
| LO (0) | MED (1) | increase | no change |
| MED (1) | MED (1) | no change | no change |
| HI (2) | MED (1) | decrease | no change |
| LO (0) | HI (2) | increase | no change |
| MED (1) | HI (2) | no change | no change |
| HI (2) | HI (2) | decrease | no change |

Essentially, the tray temperature will be changed each pass through the computer unless the ethane concentration is between the high and low limits. The effects of the ethylene concentration on the tray temperature have been removed. Also, no change will occur in the external reflux set point when the external reflux set point calculated in the above described listing is greater than or equal to the high limit for the external reflux set point.

It is noted that the feedforward control term based on changes in the feed flow rate is not required but is desirable since such feedforward control term provides a means by which corrective control action can be taken before a change in the overhead product composition or bottoms product composition would force such corrective control action. Use of the feedforward control term thus provides a means by which the production of an off-specification overhead product or bottoms product can be substantially reduced.

It is also noted that the control actions set forth in the listing and in Table 1 were implemented for a fractional distillation column with heat supply manipulated to control tray temperature. A different set of control actions would be required if reflux flow were manipulated to control tray temperature. Typically, one skilled in the art of process control could recognize what control actions would be required for a particular fractional distillation process based on the relationship between the concentration of the heavy key component in the overhead product stream and light key component in the bottoms product stream to high and low limits for these concentrations.

Signal 153, which is representative of the desired tray temperature, is provided as the set point signal to the controller block 156. Signal 62, which is representative of the actual tray temperature, is provided as the process variable input to the controller block 156. In response to signals 153 and 62, the controller block 156 provides an output signal 91 which is responsive to the difference between signal 62 and 153. Signal 91 is scaled so as to be representative of the flow rate of the heating fluid through conduit means 29 required to maintain the actual tray temperature substantially equal to the desired tray temperature as represented by signal 153. Signal 91 is provided as an output from computer means 100 and is utilized as has been previously described.

In summary, control of the overhead product composition and bottoms product composition is accomplished without the use of analysis controllers by changing the external reflux flow rate and/or flow rate of heat to the fractional distillation column, if either is required, periodically by an incremental amount to maintain the desired compositions. If a major upset occurs, the product compositions will go off specification for a period of time while the flow rates are slowly changed but this is more desirable than the rapid changes which can be caused by analysis controllers especially in situations where a product stream, such as the bottoms product, is recycled to an up stream unit as has been previously described. If the required external reflux reaches its high limit the bottoms product composition will go off specification as long as the reflux is limited but will automatically be restored as the reflux flow is reduced. Also, if desired, the feed flow rate may be utilized for feedforward compensation which improves the response of the control system to changes in the feed flow rate.

The invention has been described in terms of a preferred embodiment as illustrated in FIGS. 1 and 2. Specific components used in the practice of the invention as illustrated in FIG. 1 such as flow sensors 75, 72 and 95; flow transducers 74, 71 and 94; flow controllers 92 and 78; temperature transducer 61; and control valves 98 and 84 are each well known, commercially available control components such as are described at length in Perry's *Chemical Engineer's Handbook*, 4th Edition, Chapter 22, McGraw-Hill.

For reasons of brevity, conventional auxilliary fractionation equipment such as pumps, heat exchangers, additional measurement-control devices, etc. have not been included in the above description as they play no part in the explanation of the invention.

While the invention has been described in terms of the presently preferred embodiment, reasonable variations and modifications are possible by those skilled in the art and such variations and modifications are within the scope of the described invention and the appended claims.

That which is claimed is:
1. Apparatus comprising:
a fractional distillation column;
means for passing a feed mixture containing at least first and second components into said fractional distillation column;
means for passing a heating fluid to said fractional distillation column;
means for withdrawing an overhead vapor stream, having a substantially increased concentration of said first component with respect to the concentration of said first component in said feed mixture, from an upper portion of said fractional distillation column;
means for condensing at least a portion of said overhead vapor stream;
an accumulator;
means for passing the resulting at least partially condensed overhead stream into said accumulator;
means for withdrawing condensate from said accumulator and for passing a first portion of the thus withdrawn condensate into an upper portion of said fractional distillation column as an external reflux stream therefor and for passing a second portion of the thus withdrawn condensate as an overhead product stream;
means for withdrawing a bottoms product stream, having a substantially increased concentration of said second component with respect to the concentration of said second component in said feed mixture, from a lower portion of said fractional distillation column;
means for establishing a first signal which is representative of the concentration of said first component in said bottoms product stream;
means for establishing a second signal representative of the concentration of said second component in said overhead product stream;
means for establishing a first control signal representative of the desired flow rate of said external reflux stream in response to said first signal and said second signal, wherein said first control signal is periodically increased or decreased by a fixed increment or left unchanged depending upon the relationship between the actual concentration of said first component in said buttoms product stream as represented by said first signal and a high limit and low limit for the actual concentration of said first component in said bottoms product stream, depending upon the relationship between the actual concentration of said second component in said overhead product stream as represented by said second signal and high and low limits for the actual concentration of said second component in said overhead product stream and depending on the relationship between the magnitude of said first control signal and a high limit for the flow rate of said external reflux stream;
means for manipulating the flow rate of said external reflux in response to said first control signal so as to maintain the actual external reflux flow rate substantially equal to the desired external reflux flow rate as represented by said first control signal;
means for establishing a second control signal representative of the desired temperature at a selected point in said fractional distillation column in response to said first signal and said second signal, wherein said second control signal is periodically increased or decreased by a fixed increment or is left unchanged depending upon the relationship between the actual concentration of said first component in said bottoms product stream as represented by said first signal and said high and low limits for the actual concentration of said first component in said bottoms product stream, depending upon the relationship between the actual concentration of said second component in said overhead product stream as represented by said second signal and said high and low limits for the actual concentration of said second component in said overhead product stream and depending on the relationship between the magnitude of said first control signal and a high limit for the flow rate of said external reflux stream; and means for manipulating the flow rate of heat to said fractional distillation column in response to said second control signal so as to maintain the actual temperature at said selected point substantially equal to the desired temperature represented by said second control signal.

2. Apparatus in accordance with claim 1 wherein the manner in which said first control signal and said second control signal are changed based on the relationship of said first signal (ACB) to the high (HL1) and low (LL1) limits for the actual concentration of said first component in said bottoms product stream, the relationship of said second signal (ACO) to the high (HL2) and low (LL2) limits for the actual concentration of said second component in said overhead product stream and the relationship of said first control signal to said high limit for the flow rate of said external reflux stream is as set forth in Table I if the magnitude of said first control signal is less than said high limit for the flow rate of said external reflux stream

TABLE 1

| Relationships | | Control Signals | |
|---|---|---|---|
| First Signal | Second Signal | Second | First |
| ACB < LL1 | ACO < LL2 | no change | decrease |
| ACB < LL1 | LL2 ≦ ACO ≦ HL2 | decrease | decrease |
| ACB < LL1 | ACO > HL2 | decrease | no change |
| LL1 ≦ ACB ≦ HL1 | ACO < LL2 | increase | decrease |
| LL1 ≦ ACB ≦ HL1 | LL2 ≦ ACO ≦ HL2 | no change | no change |
| LL1 ≦ ACB ≦ HL1 | ACO > HL2 | decrease | increase |
| ACB > HL1 | ACO < LL2 | increase | no change |
| ACB > HL1 | LL2 ≦ ACO ≦ HL2 | increase | increase |
| ACB > HL1 | ACO > HL2 | no change | increase | and is as set forth in Table 2 if the magnitude of said first control signal is greater than or equal to said high limit for the flow rate of said external reflux stream:

TABLE 2

| Relationships | | Control Signals | |
|---|---|---|---|
| First Signal | Second Signal | Second | First |
| ACB < LL1 | ACO < LL2 | increase | no change |
| ACB < LL1 | LL2 ≦ ACO ≦ HL2 | no change | no change |
| ACB < LLI | ACO > HL2 | decrease | no change |
| LL1 ≦ ACB ≦ HL1 | ACO < LL2 | increase | no change |
| LL1 ≦ ACB ≦ HL1 | LL2 ≦ ACO ≦ HL2 | no change | no change |
| LL1 ≦ ACB ≦ HL1 | ACO > HL2 | decrease | no change |
| ACB > HL1 | ACO < LL2 | increase | no change |
| ACB > HL1 | LL2 ≦ ACO ≦ HL2 | no change | no change |
| ACB > HL1 | ACO > HL2 | decrease | no change |

3. Apparatus in accordance with claim 1 wherein said means for manipulating the flow rate of said external reflux in response to said first control signal comprises:

means for establishing a third signal representative of the actual flow rate of said external reflux;

means for comparing said third signal and said first control signal and for establishing a fourth signal which is responsive to the difference between said third signal and said first control signal, wherein said fourth signal is scaled so as to be representative of the position of a first control valve, operably located so as to control the flow rate of said external reflux, required to maintain the actual flow rate of said external reflux substantially equal to the desired flow rate represented by said first control signal; and means for manipulating said first control valve in response to said fourth signal.

4. Apparatus in accordance with claim 1 wherein said selected point in said fractional distillation column is a selected tray in said fractional distillation column and wherein said means for manipulating the flow rate of heat to said fractional distillation column in response to said second control signal comprises:

means for establishing a third signal representative of the actual temperature of said selected tray;

means for comparing said third signal and said second control signal and for establishing a fourth signal which is responsive to the difference between said third signal and said second control signal, wherein said fourth signal is scaled so as to be representative of the flow rate of heating fluid to said fractional distillation column required to maintain the actual temperature of said selected tray substantially equal to the desired temperature represented by said second control signal;

means for establishing a fifth signal representative of the actual flow rate of said heating fluid;

means for comparing said fourth signal and said fifth signal and for establishing a sixth signal which is responsive to the difference between said fourth signal and said fifth signal, wherein said sixth signal is scaled so as to be representative of the position of a second control valve, operably located so as to control the flow rate of said heating fluid to said fractional distillation column, required to maintain the actual flow rate of said heating fluid substantially equal to the desired flow rate represented by said fourth signal; and means for manipulating said second control valve in response to said sixth signal to thereby maintain the actual flow rate of said heating fluid to said fractional distillation column substantially equal to the desired flow rate represented by said fourth signal.

5. Apparatus in accordance with claim 1 additionally comprising:

means for establishing a third signal representative of the actual flow rate of said feed mixture to said fractional distillation column;

a lag means;

means for passing said third signal through said lag means to establish a fourth signal;

a delay means;

means for passing said fourth signal through said delay means to establish a fifth signal;

means for subtracting said fifth signal from said fourth signal to establish a sixth signal;

means for establishing a seventh signal representative of a bias term;

means for multiplying said sixth signal and said seventh signal to establish an eighth signal; and means for adding said eighth signal to said first control signal to thereby apply a feedforward compensation for changes in the flow rate of said feed mixture to said fractional distillation column to the desired flow rate of said external reflux.

6. Apparatus in accordance with claim 1 wherein the high limit for the concentration of said first component in said bottoms product stream is the desired concentration of said first component in said bottoms product stream, wherein the low limit for the concentration of said first component in said bottoms product stream is a percentage of the high limit for the concentration of said first component in said bottoms product stream, wherein the high limit for the concentration of said second component in said overhead product stream is the desired concentration of said second component in said overhead product stream and wherein the low limit for the concentration of said second component in said overhead product stream is a percentage of the high limit for the concentration of said second component in said overhead product stream.

7. A method for controlling a fractional distillation process utilized to separate first and second components contained in a feed stream flowing to a fractional distillation column, wherein a heating fluid is introduced into said fractional distillation column to effect said separation, wherein said first component is principally removed from said fractional distillation column as an overhead vapor stream, wherein said overhead vapor stream is at least partially condensed with a first portion of the condensate being returned to an upper portion of said fractional distillation column as an external reflux stream and a second portion of said condensate being removed from said fractional distillation process as an overhead proudct, and wherein said second component is principally removed from said fractional distillation column as a bottoms product, said method comprising the steps of:

establishing a first signal which is representative of the concentration of said first component in said bottoms product stream;

establishing a second signal which is representative of the concentration of said second component in said overhead product stream;

using computing means to establish a first control signal representative of the desired flow rate of said external reflux stream in response to said first signal and said second signal, wherein said first control signal is periodically increased or decreased by a fixed increment or left unchanged depending upon the relationship between the actual concentration of said first component in said bottoms product stream as represented by said first signal and a high limit and low limit for the actual concentration of said first component in said bottoms product stream, depending upon the relationship between the actual concentration of said second component in said overhead product stream as represented by said second signal and high and low limits for the actual concentration of said second component in said overhead product stream and depending on the relationship between the magnitude of said first control signal and a high limit for the flow rate of said external reflux stream;

manipulating the flow rate of said external reflux in response to said first control signal so as to maintain the actual external reflux flow rate substantially equal to the desired external reflux flow rate as represented by said first control signal;

using computing means to establish a second control signal representative of the desired temperature at a selected point in said fractional distillation column in response to said first signal and said second signal, wherein said second control signal is periodically increased or decreased by a fixed increment or is left unchanged depending upon the relationship between the actual concentration of said first component in said bottoms product stream as represented by said first signal and said high and low limits for the actual concentration of said first component in said bottoms product stream, depending upon the relationship between the actual concentration of said second component in said overhead product stream as represented by said second signal and said high and low limits for the actual concentration of said second component in said overhead product stream and depending on the relationship between the magnitude of said first control signal and a high limit for the flow rate of said external reflux stream; and manipulating the flow rate of heat to said fractional distillation column in response to said second control signal so as to maintain the actual temperature at said selected point substantially equal to the desired temperature represented by said second control signal.

8. A method in accordance with claim 7 wherein the manner in which said first control signal and said second control signal are changed based on the relationship of said first signal (ACB) to the high (HL1) and low (LL1) limits for the actual concentration of said first component in said bottoms product stream and the relationship of said second signal (ACO) to the high (HL2) and low (LL2) limits for the actual concentration of said second component in said overhead product stream and the relationship of said first control signal to said high limit for the flow rate of said external reflux stream is as set forth in Table 1 if the magnitude of said first control signal is less than said high limit for the flow rate of said external reflux stream:

TABLE 1

| Relationships | | Control Signals | |
|---|---|---|---|
| First Signal | Second Signal | Second | First |
| $ACB < LL1$ | $ACO < LL2$ | no change | decrease |
| $ACB < LL1$ | $LL2 \leq ACO \leq HL2$ | decrease | decrease |
| $ACB < LL1$ | $ACO > HL2$ | decrease | no change |
| $LL1 \leq ACB \leq HL1$ | $ACO < LL2$ | increase | decrease |
| $LL1 \leq ACB \leq HL1$ | $LL2 \leq ACO \leq HL2$ | no change | no change |
| $LL1 \leq ACB \leq HL1$ | $ACO > HL2$ | decrease | increase |
| $ACB > HL1$ | $ACO < LL2$ | increase | no change |
| $ACB > HL1$ | $LL2 \leq ACO \leq HL2$ | increase | increase |
| $ACB > HL1$ | $ACO > HL2$ | no change | increase | and is as set forth in Table 2 if the magnitude of said first control signal is greater than or equal to said high limit for the flow rate of said external reflux stream:

TABLE 2

| Relationships | | Control Signals | |
| --- | --- | --- | --- |
| First Signal | Second Signal | Second | First |
| ACB < LL1 | ACO < LL2 | increase | no change |
| ACB < LL1 | LL2 ≦ ACO ≦ HL2 | no change | no change |
| ACB < LL1 | ACO > HL2 | decrease | no change |
| LL1 ≦ ACB ≦ HL1 | ACO < LL2 | increase | no change |
| LL1 ≦ ACB ≦ HL1 | LL2 ≦ ACO ≦ HL2 | no change | no change |
| LL1 ≦ ACB ≦ HL1 | ACO > HL2 | decrease | no change |
| ACB > HL1 | ACO < LL2 | increase | no change |
| ACB > HL1 | LL2 ≦ ACO ≦ HL2 | no change | no change |
| ACB > HL1 | ACO > HL2 | decrease | no change |

9. A method in accordance with claim 7 wherein said step of manipulating the flow rate of said external reflux in response to said first control signal comprises:

establishing a third signal representative of the actual flow rate of said external reflux;

using computing means to compare said third signal and said first control signal and to establish a fourth signal which is responsive to the difference between said third signal and said first control signal, wherein said fourth signal is scaled so as to be representative of the position of a first control valve, operably located so as to control the flow rate of said external reflux, required to maintain the actual flow rate of said external reflux substantially equal to the desired flow rate represented by said first control signal; and manipulating said first control valve in response to said fourth signal.

10. A method in accordance with claim 7 wherein said selected point in said fractional distillation column is a selected tray in said fractional distillation column and wherein said step of manipulating the flow rate of heat to said fractional distillation column in response to said second control signal comprises:

establishing a third signal representative of the actual temperature of said selected tray;

using computing means to compare said third signal and said second control signal and to establish a fourth signal which is responsive to the difference between said third signal and said second control signal, wherein said fourth signal is scaled so as to be representative of the flow rate of heating fluid to said fractional distillation column required to maintain the actual temperature of said selected tray substantially equal to the desired temperature represented by said second control signal;

establishing a fifth signal representative of the actual flow rate of said heating fluid;

using computing means to compare said fourth signal and said fifth signal and to establish a sixth signal which is responsive to the difference between said fourth signal and said fifth signal, wherein said sixth signal is scaled so as to be representative of the position of a second control valve, operably located so as to control the flow rate of said heating fluid to said fractional distillation column, required to maintain the actual flow rate of said heating fluid substantially equal to the desired flow rate represented by said fourth signal; and manipulating said second control valve in response to said sixth signal to thereby maintain the actual flow rate of said heating fluid to said fractional distillation column substantially equal to the desired flow rate represented by said fourth signal.

11. A method in accordance with claim 7 additionally comprising the steps of:

establishing a third signal representative of the actual flow rate of said feed mixture to said fractional distillation column;

lagging said third signal to establish a fourth signal;

delaying said fourth signal to establish a fifth signal;

substracting said fifth signal from said fourth signal to establish a sixth signal;

establishing a seventh signal representative of a bias term;

multiplying said sixth signal and said seventh signal to establish an eighth signal; and adding said eighth signal to said first control signal to thereby apply a feedforward compensation for changes in the flow rate of said feed mixture to said fractional distillation column to the desired flow rate of said external reflux.

12. A method in accordance with claim 7 wherein the high limit for the concentration of said first component in said bottoms product stream is the desired concentration of said first component in said bottoms product stream, wherein the low limit for the concentration of said first component in said bottoms product stream is a percentage of the high limit for the concentration of said first component in said bottoms product stream, wherein the high limit for the concentration of said second component in said overhead product stream is the desired concentration of said second component in said overhead product stream and wherein the low limit for the concentration of said signal component in said overhead product stream is a percentage of the high limit for the concentration of said second component in said overhead product stream.

* * * * *